United States Patent
Yu

(12) United States Patent      (10) Patent No.: US 7,052,326 B2
(45) Date of Patent: May 30, 2006

(54) CARD CONNECTOR WITH GUIDING DEVICE

(75) Inventor: Hung-Chi Yu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/917,775

(22) Filed: Aug. 13, 2004

(65) Prior Publication Data

US 2005/0037667 A1    Feb. 17, 2005

(30) Foreign Application Priority Data

Aug. 13, 2003   (TW)  .............................. 92214632 U

(51) Int. Cl.
*H01R 24/00*     (2006.01)

(52) U.S. Cl. .................................................... 439/631

(58) Field of Classification Search ................ 439/631, 439/630, 838, 638, 159; 361/737
See application file for complete search history.

(56) References Cited

U.S. PATENT DOCUMENTS

| 6,402,529 | B1 | 6/2002 | Saito et al. | |
| 6,471,550 | B1 | 10/2002 | Maiterth et al. | |
| 6,913,492 | B1 * | 7/2005 | Kuroda et al. | ............... 439/631 |

* cited by examiner

*Primary Examiner*—Chandrika Prasad
(74) *Attorney, Agent, or Firm*—Wei Te Chung

(57) ABSTRACT

A card connector (100) is mounted on a printed circuit board for receiving at least two kinds of cards and includes a dielectric housing (1), a number of contacts (2) and terminals (3) being retained in the housing. The housing includes a first receiving space (101) for receiving a first card (5) and a second receiving space (102) for receiving a second card (6) and the two receiving spaces are provided with a common insertion opening (14). A pair of guide portions (15) positioned at an inner corner of the housing adjacent to the opening. Each guide portion includes a first leading surface (151) for guiding the first card into the first receiving space and a second leading surface (152) for guiding the second card into the second receiving space.

15 Claims, 5 Drawing Sheets

CARD CONNECTOR WITH GUIDING DEVICE

BACKGROUND OF THE INVENTION

1. Field of the Invention

The present invention relates to a connector and more particularly, to a card connector for receiving different type cards.

2. Description of the Related Art

Card connectors for two smart cards are used for a plurality of applications, for instance in mobile telephones, in payment systems and so on. It is frequently necessary that a card connector is required receiving more than one kind of smart card. U.S. Pat. No. 6,402,529 issued to Saito on Jun. 11, 2002 discloses a card connector. The Saito connector is provided for exchangeably accommodating at least two kinds of cards, or first and second cards, with different thicknesses, different sizes and different alignment positions of a plurality of contact pads. The connector comprises a housing including a top wall, a bottom wall and opposite side walls. The housing includes a first card accommodating portion defined by the side walls and the top and the bottom walls for accommodating the first card, the side walls being adapted to guide side surfaces of the first card. The top wall of the housing defines a downwardly exposed cutout communicating with the first card accommodating portion. A second card accommodating portion defined by the cutout and a portion of the first card accommodating portion beneath the cutout for accommodating the second card, the side walls of the cutout being adapted to guide side surfaces of the second card. It is clear that the first and the second card accommodating portions are different because of different thicknesses, different sizes of the cards. Therefore the first and second cards can be selectively inserted into the first and second card accommodating portions, respectively.

However, to be inserted into the connector, the cards must accurately aim at corresponding card accommodating portions and then can be inserted into corresponding slots. As a result, users cannot insert the cards quickly and conveniently.

Hence, a card connector with improved insertion slots is needed to overcome the foregoing shortcomings.

BRIEF SUMMARY OF THE INVENTION

A main object of the present invention is to provide a card connector with guide portion for receiving cards quickly and accurately and conveniently.

A card connector according to the present invention is mounted on a printed circuit board for receiving at least two kinds of cards. The connector includes a dielectric housing, a plurality of conductive contacts and conductive terminals being retained in the housing. The housing includes a first receiving space for receiving a first card and a second receiving space for receiving a second card and the two card receiving spaces are provided with a common insertion opening. A pair of guide portions formed on an inner surface of the housing adjacent to the opening. Each guide portion has a wedge-shaped configuration and includes a first leading surface for guiding the first card into the first receiving space and a second leading surface for guiding the second card into the second receiving space.

Other objects, advantages and novel features of the invention will become more apparent from the following detailed description when taken in conjunction with the accompanying drawings.

DETAILED DESCRIPTION OF THE INVENTION

Figure 1:
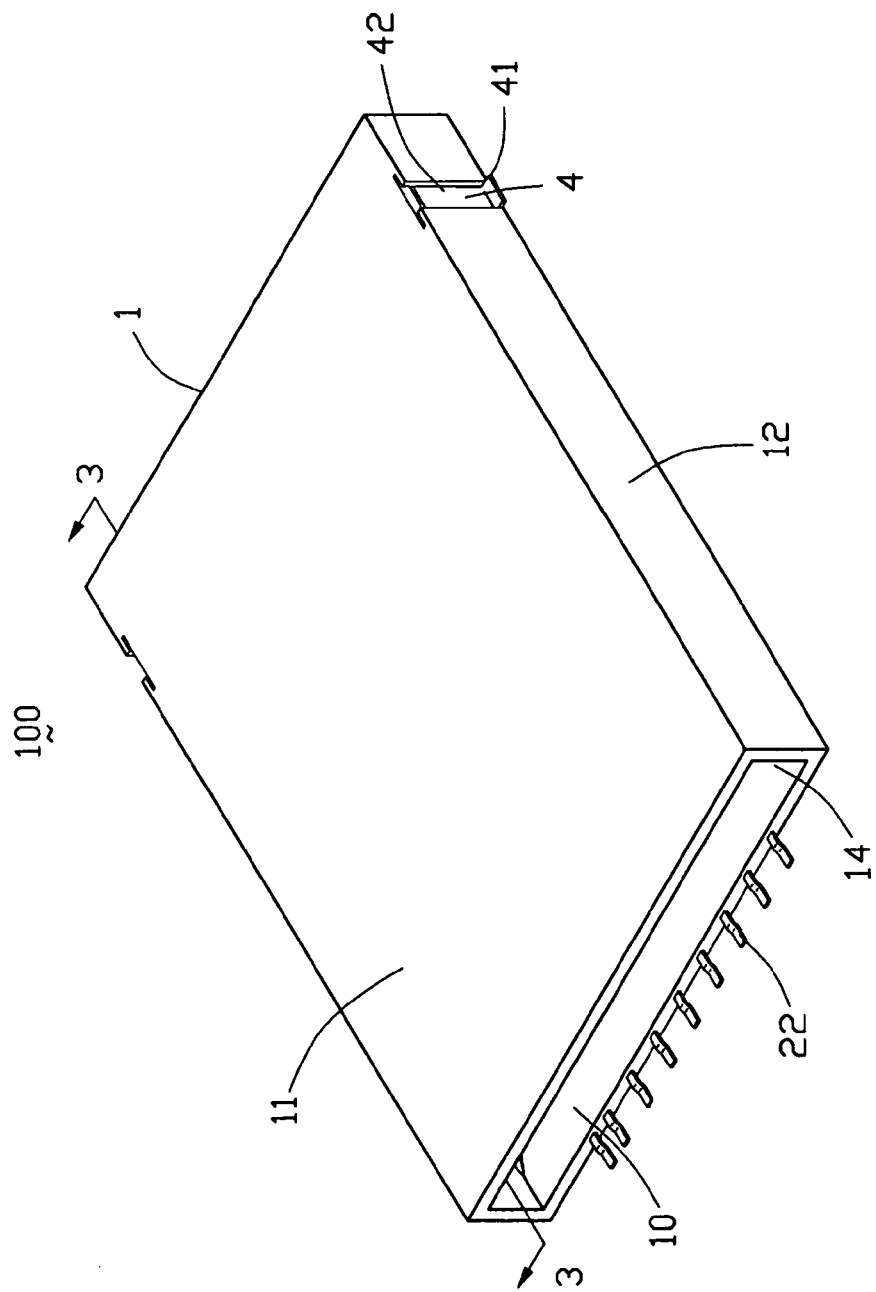
FIG. 1 is a perspective view of a card connector according to the present invention.
Figure 4:
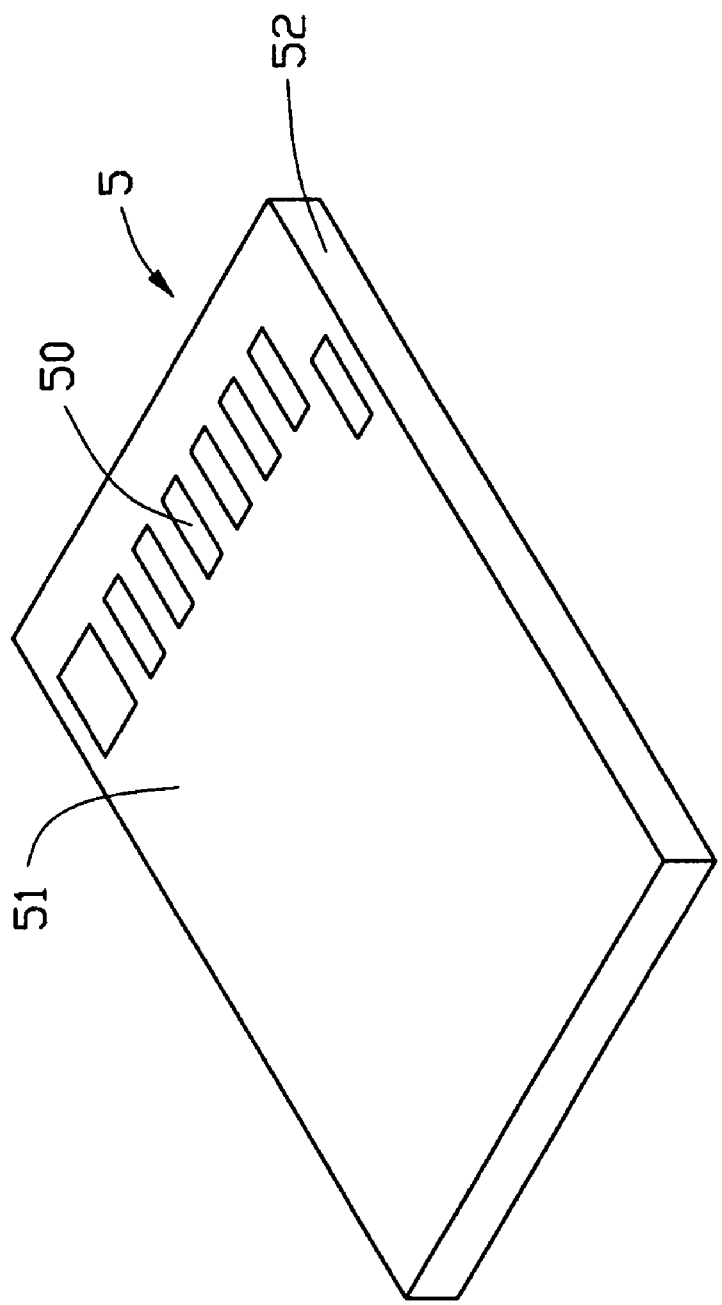
FIG. 4 is a perspective view of a first card.
Figure 5:
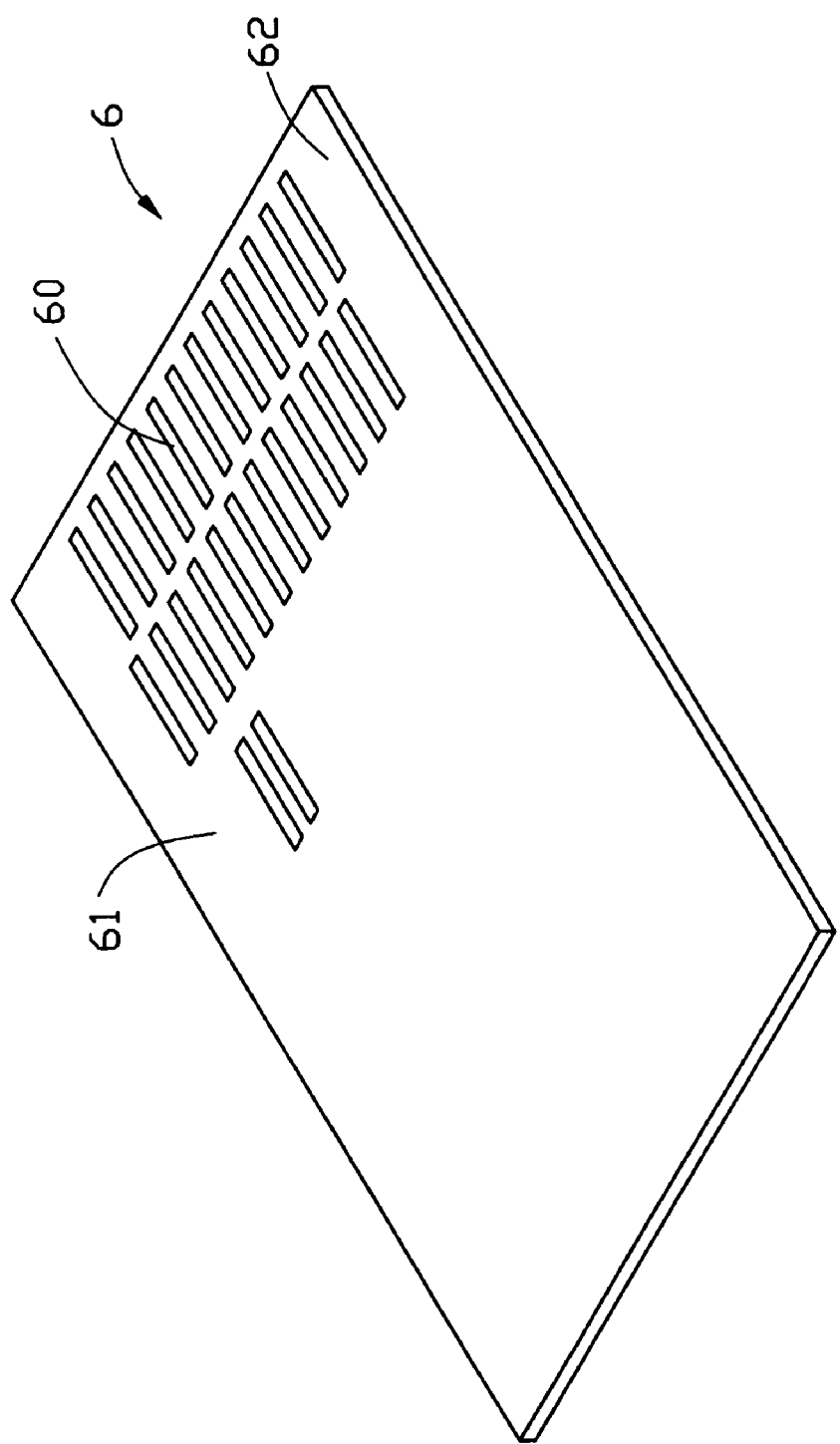
FIG. 5 is a perspective view of a second card.

Referring to FIG. 1, a card connector 100 according to the present invention is shown to alternatively receive a first card 5 (FIG. 4) or a second card 6 (FIG. 5).

First, let us explain about the two kinds of cards 4, 5 that can be inserted into the card connector 100 as embodying the present invention.

Referring to FIG. 4, the first card 5 is used for a SD Card or Multi-Media Card. The first card 5 has a predetermined width and thickness and includes a lower surface 51 and two side surfaces 52. A plurality of gold fingers 50 are formed on the lower surface 51.

Referring to FIG. 5, the second card 6 is used for a Smart Media Card. The second card 6 has a card body which is larger in width but smaller in thickness than the first card 5. The second card 6 includes a lower surface 61, two side surfaces 62 and a plurality of circuit traces 60 formed on the lower surface 61.

Next, the embodiment of the card connector 100 according to the present invention will be explained by referring to FIGS. 1 to 3.

The card connector 100 has a dielectric housing 1 including a top, bottom and apposite side walls 11, 13 and 12 which commonly define a receiving space comprising a firs card receiving space 101 and a second card receiving space 102. A common card insertion opening 14 has a substantially rectangle-shaped configuration and is cooperatively defined by front portions of the top, bottom and sidewalls 11, 12 and 13. A pair of rectangular plates 16 exposed into the receiving space respectively project from rear portions of inner surfaces of the top wall 11 and the bottom wall 13 and each has a planar inner surface parallel to inner surface of the top wall 11/the bottom wall 13. A pair of arms 161 extend forwardly and symmetrically from front edge of a corresponding plate 16 and extend along inner surfaces of the side walls 12. Each pair of arms 161 and the front edge of a corresponding plate 16 define a U-shaped cutout 162 on a corresponding top wall 11/bottom wall 13. Two pairs of guide portions 15 respectively and forwardly extend from front edges of the arms 151 and each has a substantially wedge-shaped configuration. The two pairs of guide portions 15 are symmetrically and respectively formed on the top wall 11 and the bottom wall 13 adjacent to the opening 14 for guiding the first card 5 and the second card 6. Each guide portion 15 includes an inner surface named a first leading surface 15 and an upper surface named a second leading surface 152. The first leading surfaces 151 extend forwardly and outwardly from the front edges of inner surfaces of corresponding arms 161 and end at junctions of the sidewalls 12 and the top wall 11/the bottom wall 13. The second leading surfaces 152 extend forwardly and downwardly/upwardly from the front edges of the plates 16 and end at the junctions of the sidewall 12, the top wall 11/the bottom wall 13. Front end of each first leading surface 151 and front end of a corresponding second leading surface 152 meet at a common point. Because the guide portions 15 of the top wall 11 and the bottom wall 12 are of same configuration, thus, one guiding portion 15 of the bottom wall is illustrated. Referring to FIG. 3, the first leading surface 151 decreases outwardly little by little along a first direction A, such as a transverse direction. The second leading surface 152 decreases downwardly along a second direction B, such as a vertical direction, perpendicular to the first direction. Therefore, the guide portion converges in the first direction A and the second direction B.

Figure 2:
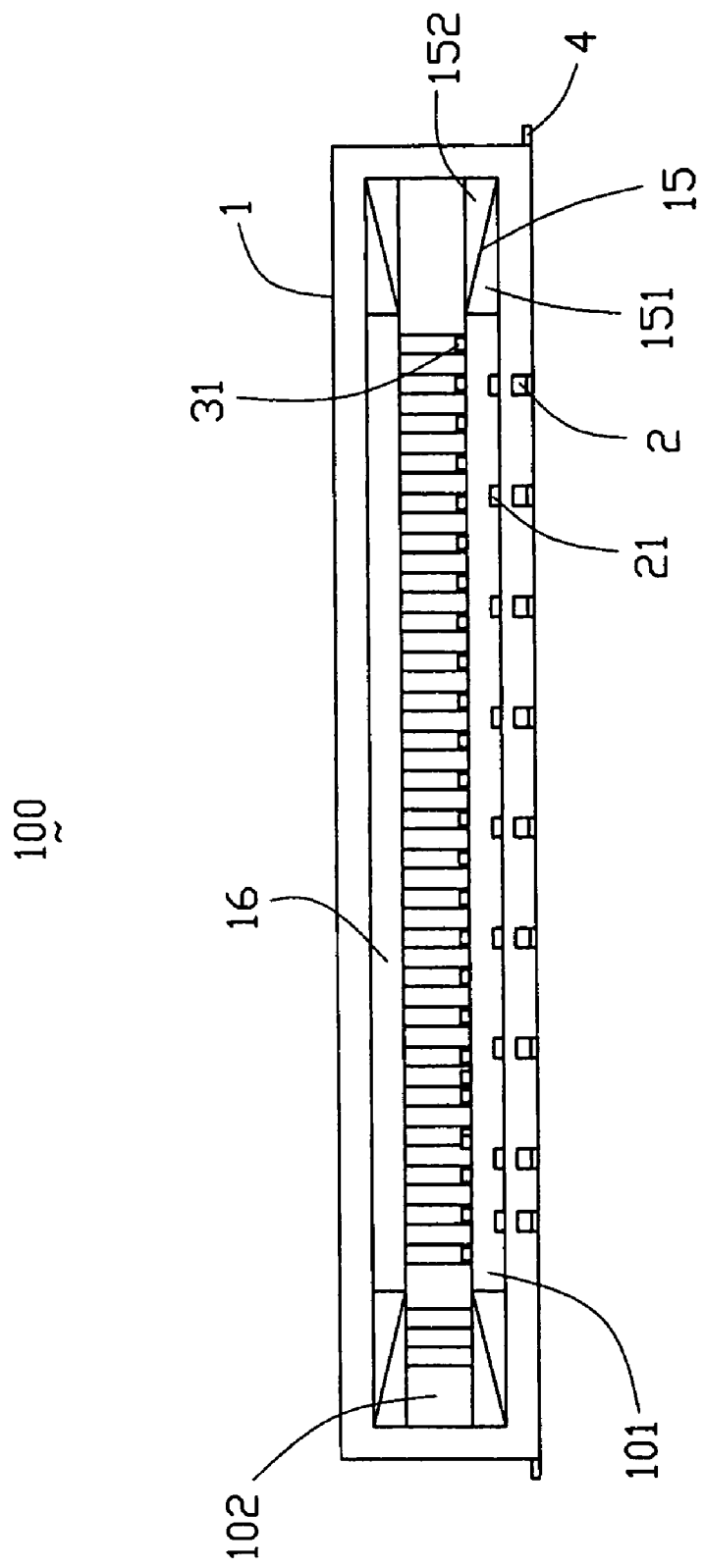
FIG. 2 is a front elevantional view of FIG. 1.
Figure 3:
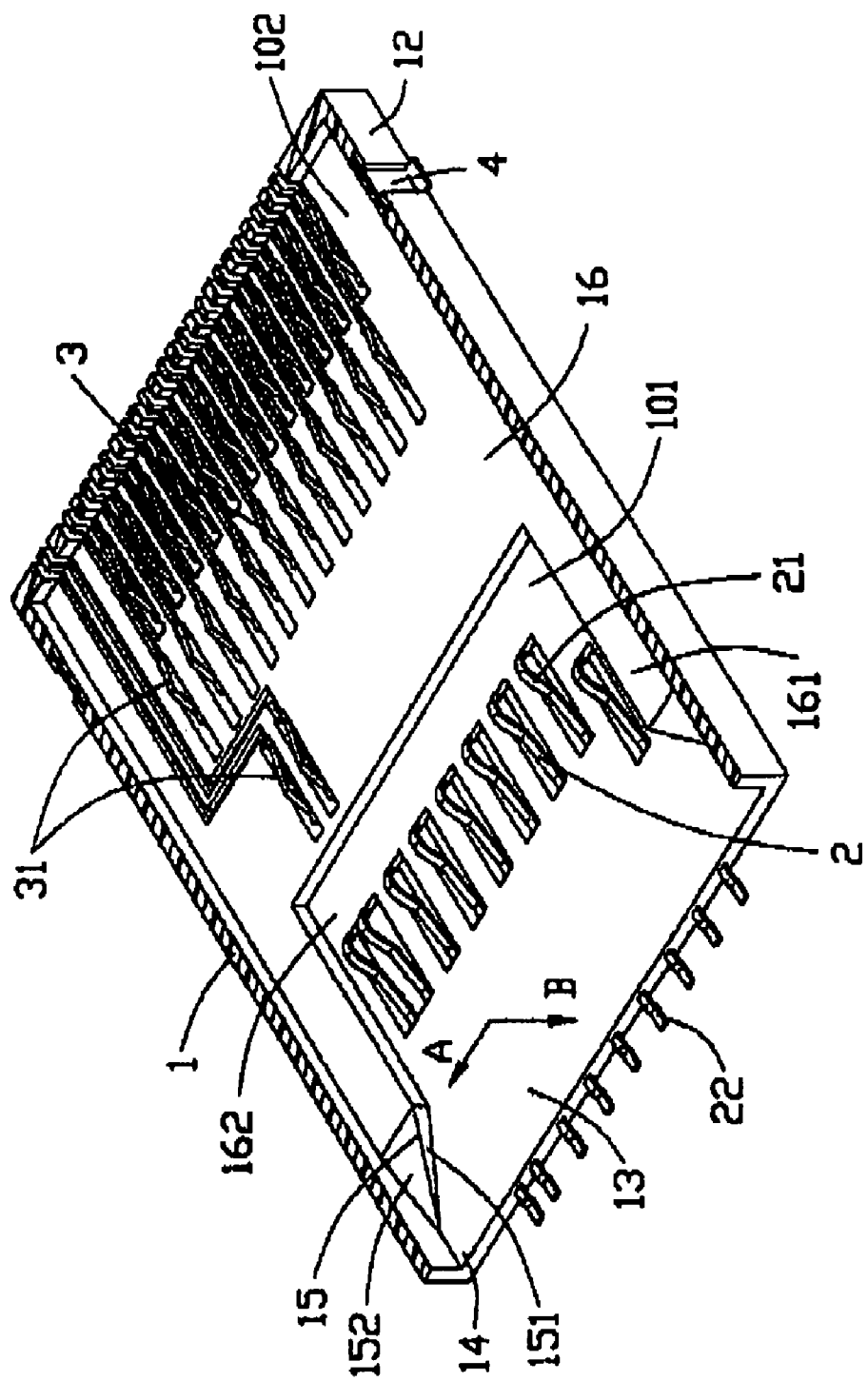
FIG. 3 is a cross-section view taken along the line 3—3 of the FIG. 1.

Referring to FIGS. 1 to 3 in conjunction with FIGS. 4 and 5, a first card receiving space 101 is defined by the cutouts 162 and opposite inner surfaces of the top wall 11 and the bottom wall 13 and is adjacent to the opening 14. The scope of the first receiving space 101 is sized corresponding to the outer periphery of the first card 5 for receiving the first card 5. A second card receiving space 102 is defined by the inner surfaces of the side walls 12, lower surfaces of the rectangular plate 16 and the arms 161 formed on the top wall 11 and the upper surfaces of the rectangular plate 16 and the arms 161 formed on the bottom wall 13. The second card receiving space 102 has the same axis as the first receiving space 101 and is lower in height but wider in width than the first receiving space 101 and is sized corresponding to the outer periphery of the second card 6 for receiving the second card 6.

Furthermore, the bottom wall 13 defines a plurality of slots communicating with the first receiving space 101 and a plurality of recesses communicating with the second receiving space 102. The slots are parallelly defined through a front portion of the bottom wall 13 for receiving a plurality of contacts 2 therein. The recesses are parallelly spaced apart one another through rear portions of the bottom wall 13 and the plate 16 of the bottom wall 13 for receiving a plurality of terminals 3 therein.

The contacts 2 are stamped and each has a spring contact section 21 upwardly projecting for connecting with a corresponding gold finger 50 of the first card 5 and a soldering section 22 forwardly extending beyond the front portion of the bottom wall 13 of the housing 1 for soldering to circuit traces of a printed circuit board (PCB, not shown).

The terminals 3 are also stamped and each similarly has a contact portion 31 upwardly projecting for connecting with a corresponding circuit trace 60 of the second card 6 and a soldering portion (not shown) rearwardly extending beyond the rear portions of the bottom wall 13 and the plate 16 of the bottom wall 13 for soldering to circuit traces of the PCB.

A plurality of board locks 4 extend downwardly along the side walls 12. Each board lock 4 includes a locking portion 42 locked by the side walls 12 and a tail portion 41 soldered to the PCB.

In assembly, the contacts 2 and the terminals 3 are installed in corresponding slots and recesses of the bottom wall 13 respectively. The contact sections 21 of the contacts 2 upwardly project above the slots and the soldering portions 22 forwardly extend beyond the front portion of the bottom wall 13 of the housing 1 for soldering to corresponding circuit traces of the PCB. The contact portions 31 of the terminals 3 upwardly project above the upper surface of the plate 16 of the bottom wall 13 and the soldering portions rearwardly extend beyond the rear portion of the bottom wall 13 of the housing 1 for soldering to corresponding circuit traces of the PCB. The locking portions 41 of the board locks 4 are locked with the side walls 12 and the tail portions 41 are soldered to the PCB.

In using, when the first card 5 is inserted into the opening 14, the first card 5 is guided by the first leading surfaces 151 and enters into the first receiving space 101. The contact sections 21 of the contacts 2 are deflected downwardly by the inserted first card 5 and electrically connect with the gold fingers 50 of the first card 5. The transverse movement of the first card 5 is restricted by the cutouts 162 of the top and the bottom walls 11 and 13. When the second card 6 is inserted into the opening 14, the second card 6 is guided by the second leading surfaces 152 and enters into the second receiving space 102. The contact portions 31 of the terminals 3 are deflected downwardly by the inserted second card 6 and electrically connected with the circuit traces 60 of the second card 6. The vertical movement of the second card 6 is restricted by the inner surfaces of the opposite plates 16 of the top and the bottom walls 11 and 13. Therefore accurately insertion and extraction is conveniently obtained.

It is to be understood, however, that even though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector for exchangeably receiving a first card and a second card which is larger in width but smaller in thickness than the first card, the card connector comprising:
   a dielectric housing including a first receiving space for receiving the first card and a second receiving space for receiving the second card, a common card insertion opening being provided for both of the card spaces;
   a plurality of contacts and a plurality of terminals being retained in the housing, the contacts projection into the first receiving space for electrically connecting the first card and the terminals projection into the second receiving space for electrically connecting the second card; and
   a pair of guide portions symmetrically disposed on both a top wall and a bottom wall of the housing and positioned adjacent to the opening and each having a first leading surface for guiding the first card into the first receiving space and a second leading surface for guiding the second card into the second receiving space.

2. The card connector according to claim 1, wherein said guide portion is located at an inner corner of the housing.

3. The card connector according to claim 2, wherein the housing comprises a top inner surface, a bottom inner surface and opposite side inner surfaces, with a pair of plates formed on the bottom inner surface and beneath the top inner surface.

4. The card connector according to claim 3, wherein the side inner surfaces, planar inner surfaces of the pair of plates cooperatively define the second receiving space.

5. The card connector according to claim 4, wherein the bottom inner surface defines a bottom cutout communicating with the second receiving space, the first receiving space being defined by the cutout and a portion of the second receiving space above the cutout.

6. The card connector according to claim 5, wherein the top inner surface defines a top cutout opposite to the bottom cutout of the bottom inner surface, the top cutout being a portion of the first receiving space.

7. The card connector according to claim 5, wherein the first leading surface of the guide portion extends from a front edge of an inner surface of the bottom cutout to a lower edge of the inner side surface.

8. The card connector according to claim 4, wherein the second leading surface of the guide portion extends from a front edge of the bottom inner surface of the bottom cutout to a lower edge of the inner side surface.

9. The card connector according to claim 2, wherein a front end of the first leading surface and a front end of the second leading surface meet at a common point.

10. The card connector according to claim 4, wherein the first leading surface is substantially perpendicular to the top and bottom inner surfaces, and the second leading surface is substantially perpendicular to the inner side surfaces.

11. A card connector for exchangeably receiving at least two cards, or a first card and a second card, with different thicknesses, different sizes and different alignment positions of a plurality of circuit trace, the card connector comprising:
   a dielectric housing including a receiving space comprising a first receiving space for receiving the first card and a second receiving space for receiving the second card, a common card insertion opening being provided for both of the card receiving spaces;
   at least a pair of guide portions disposed into the receiving space and positioned adjacent to the opening and each having a first leading surface for guiding the first card into the first receiving space and the second leading surface for guiding a second card into the second receiving space.

12. The card connector according to claim 11, wherein said guide portions are located at inner corners of the housing.

13. The card connector according to claim 12, wherein the housing comprises a top inner surface, a bottom inner surface and side opposite inner surfaces.

14. The card connector according to claim 13, wherein the first leading surface is substantially perpendicular to the top and bottom inner surfaces, and the second leading surfaces is substantially perpendicular to the inner side surfaces.

15. The card connector according to claim 12, wherein the guide portion is substantially wedge-shaped configuration, with front end of the first leading surface and front end of the second leading surface substantially meeting at a common point.

* * * * *